(12) United States Patent
Muljono et al.

(10) Patent No.: US 7,609,091 B2
(45) Date of Patent: Oct. 27, 2009

(54) LINK TRANSMITTER WITH REDUCED POWER CONSUMPTION

(75) Inventors: Harry Muljono, San Ramon, CA (US);
Stefan Rusu, Sunnyvale, CA (US);
Yanmei Tian, Sunnyvale, CA (US);
Mubeen Atha, Sunnyvale, CA (US);
David J. Ayers, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 265 days.

(21) Appl. No.: 11/240,585

(22) Filed: Sep. 29, 2005

(65) Prior Publication Data
US 2007/0071111 A1    Mar. 29, 2007

(51) Int. Cl.
*H03K 17/16* (2006.01)

(52) U.S. Cl. .......................................... 326/82; 326/21
(58) Field of Classification Search .............. 326/82–87, 326/56–58
See application file for complete search history.

(56) References Cited

U.S. PATENT DOCUMENTS

| | | | |
|---|---|---|---|
| 5,920,204 A * | 7/1999 | Bruno .......................... | 326/86 |
| 6,411,146 B1 * | 6/2002 | Kuo ............................ | 327/198 |
| 6,803,820 B1 | 10/2004 | Muljono | |
| 7,069,455 B2 | 6/2006 | Muljono et al. | |
| 7,135,884 B1 * | 11/2006 | Talbot et al. ................... | 326/30 |
| 7,139,540 B2 * | 11/2006 | Wu et al. ................. | 455/251.1 |

* cited by examiner

*Primary Examiner*—Don P Le
(74) *Attorney, Agent, or Firm*—Erik R. Nordstrom

(57) ABSTRACT

With some transmitter embodiments disclosed herein, static power consumption in low power modes may be reduced without excessively increasing latency.

20 Claims, 3 Drawing Sheets

LINK TRANSMITTER WITH REDUCED POWER CONSUMPTION

BACKGROUND

So-called point-to-point links between a transmitter and a receiver may be used to communicate between (or within) integrated circuit (IC) chips. Such links may use differential signaling schemes operating in various different modes including active, idle, and low power modes. With some current approaches, low power modes may be entered by partially (or even wholly) shutting down transmitter drivers to effectively reduce power consumption. Unfortunately, such an approach may adversely affect link bandwidth, may result in handshaking latency between the transmitter and receiver, and may increase circuit complexities. Accordingly, achieving improved low power link solutions may be desired.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

With some transmitter embodiments disclosed herein, static power consumption in low power modes may be reduced without excessively increasing latency.

Figure 2:
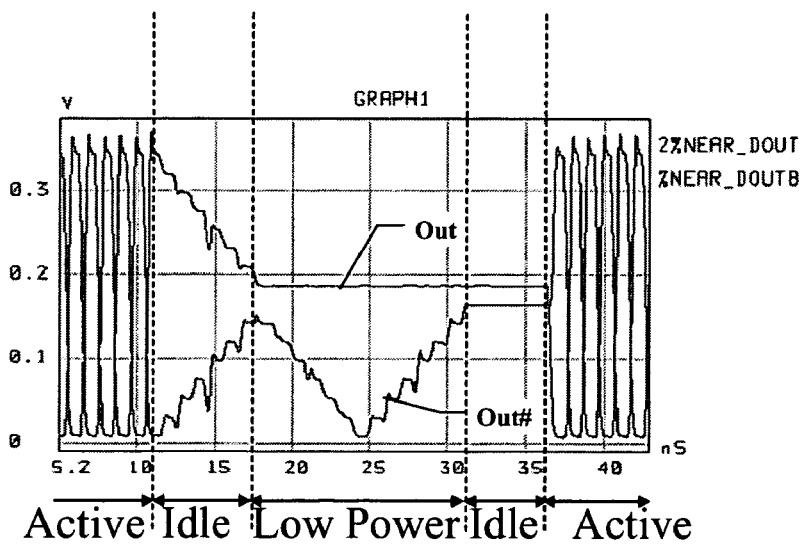
FIG. 2 is a diagram showing channel signals for the transmitter of FIG. 1 for different operating modes according to some embodiments.

As shown in the simulated signal diagram of FIG. 2, a point-to-point link signal may comprise a signal having first (Out) and second (Out#) differential signal components. Associated with such signal components, there may be two relevant parameters including common mode level and signal difference. Common mode level is the average signal level of the first and second signal components, while signal difference is the difference between the two components.

The signal difference indicates whether a "1" or a "0" is being transmitted. For example, a "1" may be perceived when the first signal component is greater than the second component, and a "0" may be perceived when the second component is greater than the first component. On the other hand, common mode level is associated with sufficient signal strength, e.g., sufficient difference (or signal swing) to be reliably perceived by a receiver. For example, in an active mode, the common mode level may be at a sufficiently large level (e.g., about 190 mV in FIG. 2) to effectively transmit differential data at sufficiently large signal differences.

When the link is in an idle mode, the signal difference may be reduced, but the common mode level may be maintained to keep the link in a ready state for transmission. However, even though the signal difference is reduced, static power consumption still occurs due to the maintained common mode level. Thus, if feasible (e.g., when the link may be idle for a longer amount of time) it may be desirable to have a low power state where the common mode level is reduced to reduce the overall static power consumption. At the same time, however, it may be desirable to maintain a sufficient signal difference to, for example, maintain the receiver in a ready (or semi-ready) state. Accordingly, some embodiments disclosed herein are directed to achieving a low power mode with a reduced common mode level but with sufficient signal differences. Other embodiments may be directed to achieving reduced signal difference levels that are still suitable for transmitting data, e.g., in active operating modes.

Figure 1:
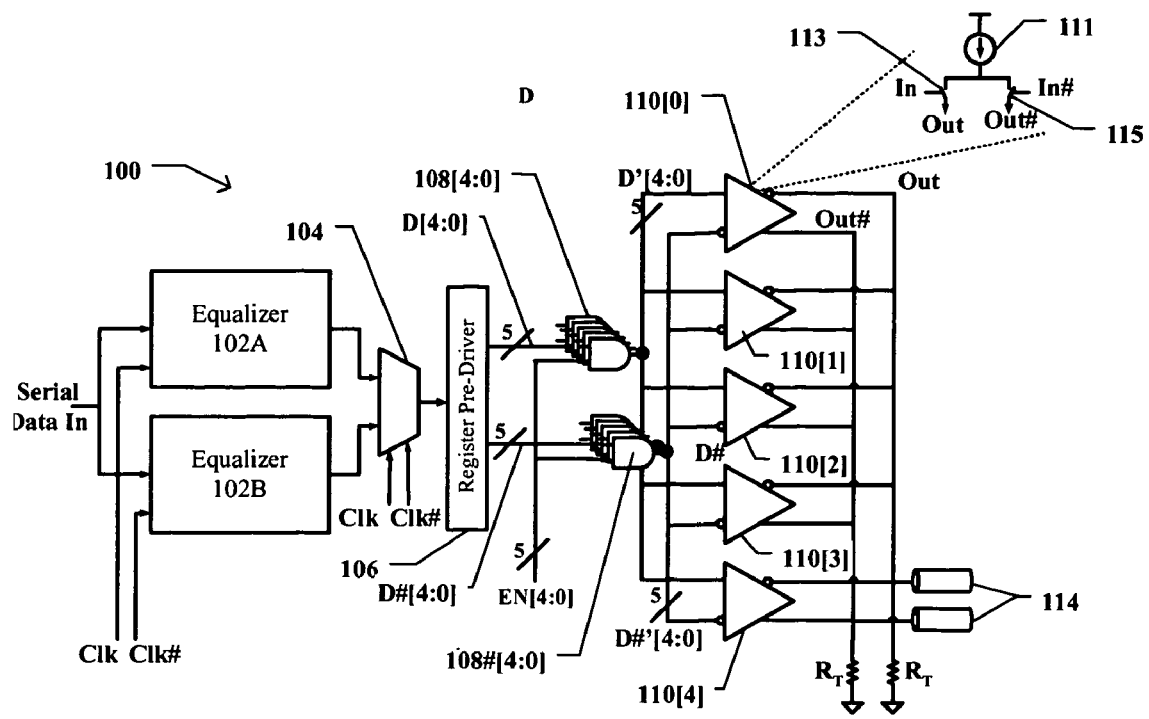
FIG. 1 is a block diagram of a transmitter according to some embodiments.

With reference to FIG. 1, a transmitter 100 in accordance with some embodiments is shown. In this embodiment, switching drivers are gated during a low power mode thereby providing a fast mode for entering and exiting the low power mode, e.g., in a matter of few clock cycles. Transmitter 100 generally comprises complementary equalizers 102A, 102B, multiplexer 104, register pre-driver 106, power reducing gates 108[4:0], 108#[4:0], differential drivers 110[4:0], and termination resistors $R_T$ (e.g., 50 ohm) for transmitting differential data along differential channel 114. As shown from driver 110[0], each driver is a differential driver comprising a current source 111 and complementary input switch devices 113, 115. In some embodiments, the current source and complementary input switch devices are each implemented with a P-type MOS (metal oxide semiconductor) transistor.

Complementary equalizers 102A and 102B have a common serial data input signal and separate serial output signals coupled to inputs of the multiplexer 104. They are clocked with complementary clock signals (Clk, Clk#) to transmit the serial data on both clock edges for each clock cycle, e.g., such as with a double data rate (DDR) topology. Accordingly, the multiplexer 104 is controlled with the Clk and Clk# signals to alternatively pass data from the complementary equalizers 102A, 102B.

Serial data passed out of the multiplexer 104 may be relatively weak. It is thus coupled to register pre-driver 106 to store (if desirable) and buffer (or amplify) it sufficiently to be driven onto the differential channel 114. Pre-driver 106 also converts the single-ended signals into differential signals (D[4:0]/D#[4:0]) providing each of the five first signal components (D[4:0]) at an input of an appropriate one of the five power reducing gates 108[4:0] and each of the five second signal components (D#[4:0]) at an input of an appropriate one of the five power reducing gates 108#[4:0]. An appropriate one of the five enable signals (EN[4:0]) is applied at other inputs of the power reducing gates 108[4:0], 108#[4:0], as indicated. The outputs of the power reducing gates 108[4:0], 108#[4:0] (AND gates in the depicted embodiment) are in turn coupled to the inputs of the differential drivers 110[4:0].

In the depicted embodiment, the five drivers (110[4:0]) are coupled together, essentially in parallel, to additively generate the differential output signal at channel 114. The multiple number of drivers are used to provide different combinations of output swing levels. For example, in a low power mode, only driver 110[4] may be activated, while in an active mode, all five drivers may be activated. Depending on design considerations, different combinations of drivers 110 may be activated to achieve specific objectives. In some embodiments, the drivers are not necessarily of equal strength but rather, provide different output strengths to allow for a wider array of overall output strength combinations. For example, in some embodiments, they may be binary weighted, e.g., driver 110[4] is twice as strong as driver 110[3], which is twice as strong as driver 110[2], which is twice as strong as driver 110[1], which is twice as strong as driver 110[0]. In other embodiments, they may be linear or alternatively weighted.

In operation, when the transmitter is in an active mode, the enable (EN[4:0]) signals are asserted passing the data outputs from the pre-driver 106 to all five drivers 110[4:0] through the power reducing gates 108[4:0], 108'[4:0]. As indicated in FIG. 2, this results in differential data (Out/Out#) being transmitted out of the drivers at a full swing (from about 0 to 380 mV).

At the end of an idle mode (see FIG. 2, before the beginning of low power mode), D[4:0] is '10000, D#[4:0] is '01111, and EN[4:0] is at '11111 resulting in a very small (1 bit) signal difference but with essentially the same (as in active mode) common mode level (about 190 mV). At the beginning of the low power mode, the EN[4:0] signals, starting from the least significant bit (EN[0]) and progressing one cycle at a time to EN[3], transition from a '1 to a '0 (leaving EN[4] at '1). Thus, D'[0] and D'#[0]) zero out, then D'[1] and D'#[1]) zero out, and so on until D[3:0] and D'#[3:0] are zeroed, and D'[4]/ D'#[4] are at '1/'0. Thus, at steady state low power mode, EN[4:0]='10000, D[4:0]='1XXXX and D#[4:0]='0XXXX resulting in D'[4:0]='10000 and D'#[4:0]='00000. Since D[4:0] did not change, the first component (Out) remains the same, while D'#[4:0] moves closer to '0 resulting in the second component (Out#) getting closer to 0. This results in a low power mode with a reduced common mode level (about 100 mV) but with a sufficiently maintained signal difference, e.g., to keep the receiver out of a "sleep" mode. The reverse of the sequence occurs when exiting low power mode (i.e. EN[4: 0] starts transitioning to '1s, starting from the most significant bit).

(It should be appreciated that any suitable logic combination may be used to achieve this result and thus, the specifics are not necessarily important. For example, depending on the particular devices used to implement the drivers, an asserted output from the power reducing gates may be High or Low and thus, appropriate different device combinations may be used. Likewise, any suitable combination of activated drivers may be used in a low power mode depending upon particular design objectives.)

Figure 3:
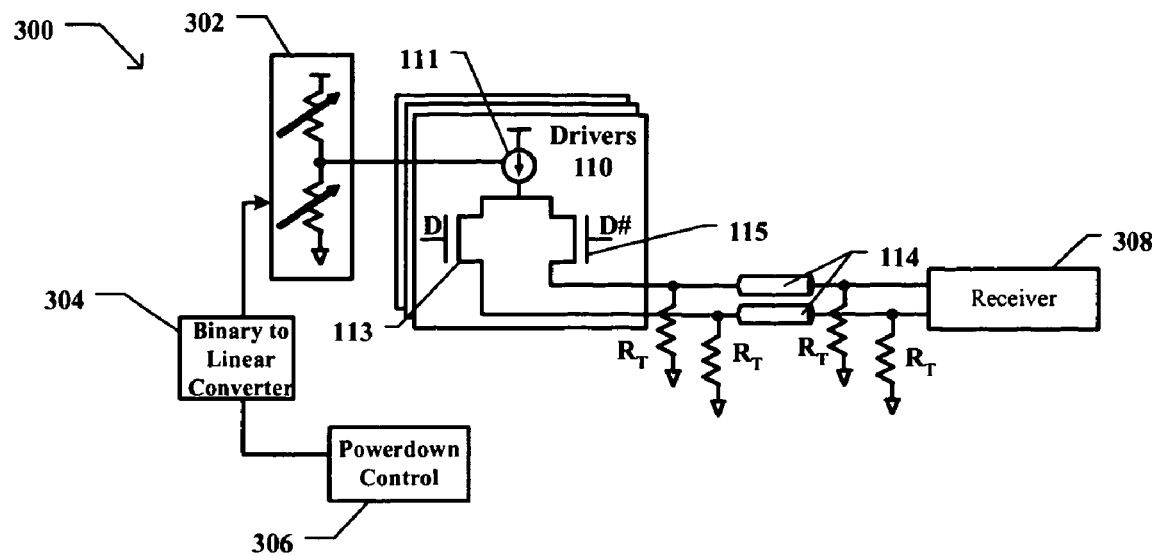
FIG. 3 is a block diagram of a communications link according to some embodiments.

With reference to FIG. 3, a transmitter 300 using a different approach is shown. With this approach, the bias levels of the output drivers 110 are controlled to reduce common mode level during a low power mode, as shown in the simulated signal diagram of FIG. 4. Depicted is a bias control circuit that comprises a voltage controlled resistor divider 302 (coupled between a supply and ground reference), a binary-to-linear converter 304, and a power-down control circuit 306. In some embodiments, the voltage divider 302 supply could be provided from a bias voltage in a global bias generation circuit (e.g., band-gap, voltage and temperature compensation). With this approach, gradual reduction of bias current levels in the drivers 110 is provided to reduce the common mode level, e.g., barely above the minimum level required by the receiver to detect correct logic values.

Figure 4:
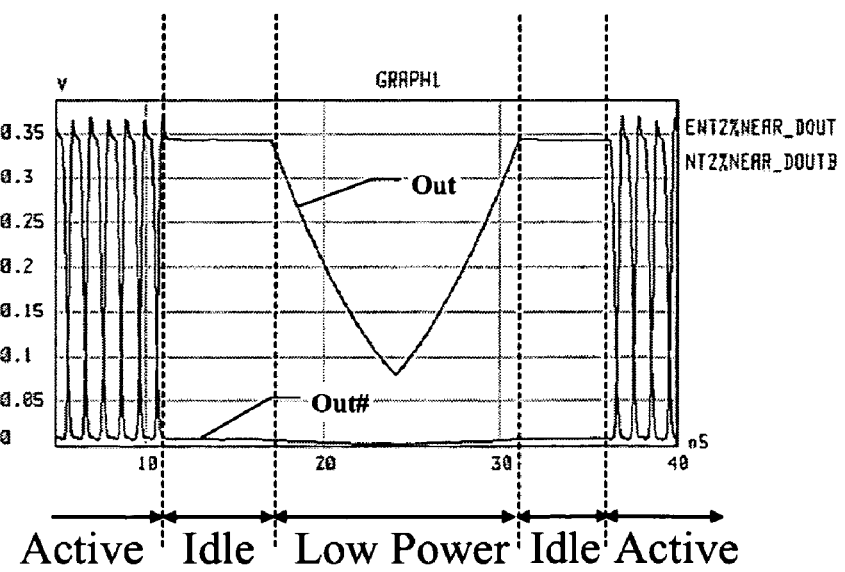
FIG. 4 is a diagram showing channel signals for the system of FIG. 3 for different operating modes according to some embodiments.

As shown in FIG. 4, both the first and second differential components are reduced resulting in a common mode level of about 50 mV, while retaining a signal difference (albeit a relatively small difference) between the signal components. This approach may be slower but less noisy compared to the approach of FIG. 1.

Figure 5:
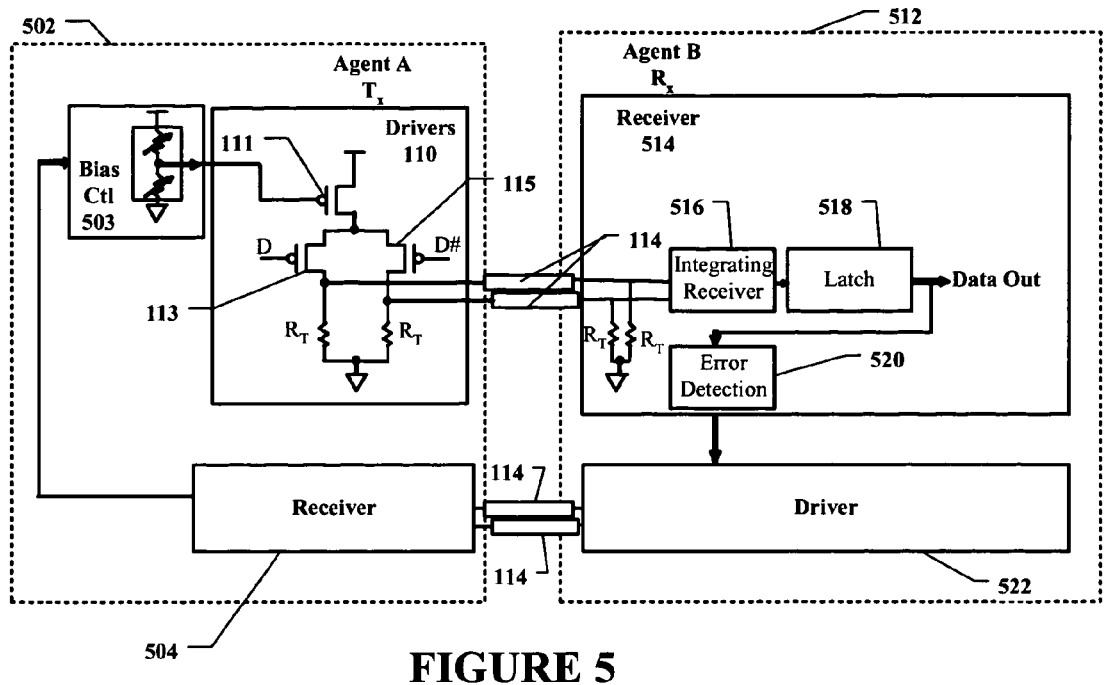
FIG. 5 is a block diagram of a communications link according to some other embodiments.

With reference to FIG. 5, yet another approach is presented. In this depiction, the bias levels of drivers in a first communicating agent (Agent A) are controlled in response to error information received back from a linked receiver in a second communicating agent (Agent B). The first agent 502 comprises drivers 110, bias control circuitry 503, and a first client receiver 504. The second agent 512 comprises a driver (transmitter or at least part of a transmitter) 522 linked to the receiver 503 in the first agent and a receiver 514 linked to the driver(s) 110 I the first agent. The second agent receiver 514 comprises an integrating receiver 516, latch 518, and error detection circuit 520 coupled to the second agent driver 522.

During an initial training session, the first agent driver transmits known data to the second agent receiver 514 using an initial driver bias level from the bias control circuit 503. The error detection circuit 520 reports back to it that an error did or did not occur. If not, the first client repeats the training sequence transmission but with a lower bias level for its drivers 110. This continues until an error is detected, and from here, the bias control circuit 503 increments the bias level the previous level where no error occurred. In this way, the transmitter drivers 110 are biased to operate at reduced but tolerable power levels.

It should be appreciated that in the disclosed embodiments, relevant circuit portions of point-to-point link transmitters and receivers are shown. However, not all circuits or circuit features are necessarily depicted and discussed. Similarly, transmitter features are described in one direction, but it should be appreciated that in many point-to-point embodiments, links will in many cases be bi-directional and thus, clients (chip or chip sections) may have both transmitters and receivers to both send and receive data.

Figure 6:
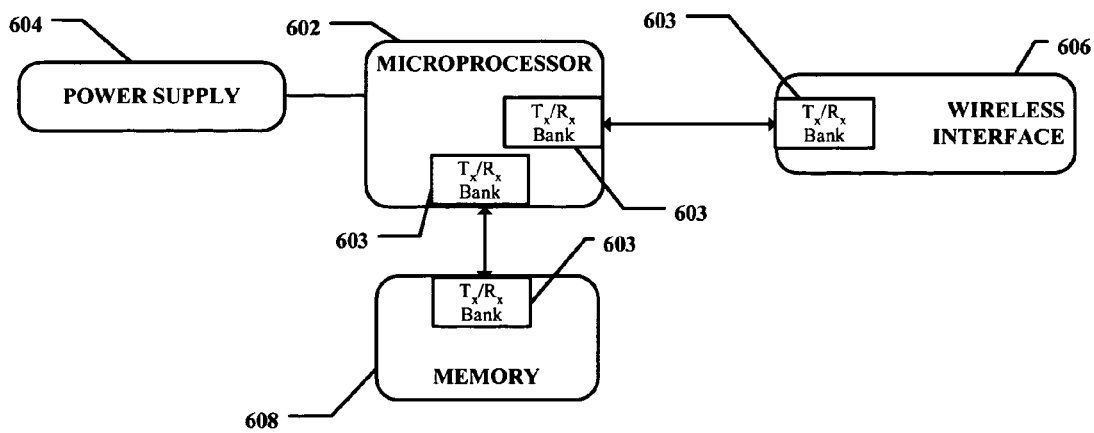
FIG. 6 is a block diagram of a computer system with a communications link according to some embodiments.

With reference to FIG. 6, one example of a computer system is shown. The depicted system generally comprises a processor 602 that is coupled to a power supply 604, a wireless interface 606, and memory 608. It is coupled to the power supply 604 to receive from it power when in operation. It is coupled to the wireless interface 606 and to the memory 608 with separate point-to-point links via transmitter/receiver banks 603 to communicate with the respective components. The transmitter/receiver banks 603 each include one or more sets of transmitters in accordance with transmitter embodiments disclosed herein.

It should be noted that the depicted system could be implemented in different forms. That is, it could be implemented in a single chip module, a circuit board, or a chassis having multiple circuit boards. Similarly, it could constitute one or more complete computers or alternatively, it could constitute a component useful within a computing system.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chip set components, programmable logic arrays (PLA), memory chips, network chips, and the like.

Moreover, it should be appreciated that example sizes/ models/values/ranges may have been given, although the present invention is not limited to the same. As manufacturing techniques (e.g., photolithography) mature over time, it is expected that devices of smaller size could be manufactured. In addition, well known power/ground connections to IC chips and other components may or may not be shown within the FIGS. for simplicity of illustration and discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits) are set forth in order to describe example embodiments of the invention, it should be apparent to one skilled in the art that the invention can be practiced without, or with variation of, these specific details. The description is thus to be regarded as illustrative instead of limiting.

What is claimed is:

1. A chip, comprising:
   a transmitter circuit to generate a differential signal and communicate it to a receiver, the transmitter to operate in an active mode where the differential signal has an associated common mode level and signal difference and in a low power mode where the signal has an associated common mode level that is less than the active mode common mode level and a signal difference sufficient to be perceived by the receiver.

2. The chip of claim 1, in which the transmitter comprises drivers selectably and additively coupled to one another to generate the differential signal.

3. The chip of claim 2, in which at least some of the drivers are gated off during the low power mode.

4. The chip of claim 3, in which the drivers are differently weighted, the largest weighted driver remaining on to produce a signal difference when the transmitter is in the low power mode.

5. The chip of claim 4, in which the drivers are binary weighted.

6. The chip of claim 1, in which the transmitter comprises a one or more differential drivers to generate the differential signal and a bias generator to bias the one or more drivers at different levels during the active and low power modes.

7. The chip of claim 6, in which the receiver includes an error detection circuit to enable the driver to be biased at a reduced level, using an initial training sequence, while in the active mode.

8. The chip of claim 1, in which the transmitter can also operate in an idle mode having an associated common mode level that is close to the active mode common mode level and a signal difference approaching zero.

9. A computer comprising:
   a microprocessor chip having a transmitter circuit;
   a wireless interface chip having a receiver to be linked to the microprocessor chip transmitter, the transmitter to generate a differential signal and communicate it to the receiver, the transmitter to operate in an active mode where the differential signal has an associated common mode level and signal difference and in a low power mode where the signal has an associated common mode level that is less than the active mode common mode level and a signal difference sufficient to be perceived by the receiver; and
   an antenna coupled to the wireless interface chip to electromagnetically link it to a wireless network.

10. The computer of claim 9, in which the transmitter comprises drivers selectably and additively coupled to one another to generate the differential signal.

11. The computer of claim 10, in which at least some of the drivers are gated off during the low power mode.

12. The computer of claim 11, in which the drivers are differently weighted, the largest weighted driver remaining on to produce a signal difference when the transmitter is in the low power mode.

13. The computer of claim 12, in which the drivers are binary weighted.

14. The computer of claim 10, in which the transmitter comprises a bias generator to bias the drivers at different levels during the active and low power modes.

15. A chip, comprising:
   a driver to generate a differential signal and communicate it to a receiver, the driver to operate in an active mode where the differential signal has an associated common mode level and signal difference and in a low power mode where the signal has an associated common mode level that is less than the active mode common mode level and a signal difference sufficient to be perceived by the receiver; and
   a bias generator to bias the driver at different levels during the active and low power modes.

16. The chip of claim 15, in which the driver comprises constituent drivers selectably and additively coupled to one another to generate the differential signal.

17. The chip of claim 16, in which at least some of the constituent drivers are gated off during the low power mode.

18. The chip of claim 17, in which the constituent drivers are differently weighted, the largest weighted driver remaining on to produce a signal difference when the transmitter is in the low power mode.

19. The chip of claim 18, in which the constituent drivers are binary weighted.

20. The chip of claim 15, in which the receiver includes an error detection circuit to enable the driver to be biased at a reduced level, using an initial training sequence, while in the active mode.

* * * * *